US012665739B2

(12) United States Patent　　(10) Patent No.: US 12,665,739 B2
Genise et al.　　(45) Date of Patent: Jun. 23, 2026

(54) SIMD INTERACTIVE COMPARISON USING GARBLED CIRCUITS AND INTERACTIVE BOOTSTRAPPING FOR HOMOMORPHIC ENCRYPTION

(71) Applicant: Duality Technologies, Inc., Maplewood, NJ (US)

(72) Inventors: Nicholas Genise, Edgewater, NJ (US); Daniele Micciancio, San Diego, CA (US); Yuriy Polyakov, Fair Lawn, NJ (US); Vinod Vaikuntanathan, Boston, MA (US)

(73) Assignee: Duality Technologies, Inc., Maplewood, NJ (US)

( * ) Notice: Subject to any disclaimer, the term of this patent is extended or adjusted under 35 U.S.C. 154(b) by 381 days.

(21) Appl. No.: 18/353,430

(22) Filed: Jul. 17, 2023

(65) Prior Publication Data

US 2023/0361986 A1　　Nov. 9, 2023

Related U.S. Application Data

(63) Continuation-in-part of application No. 17/964,335, filed on Oct. 12, 2022, now Pat. No. 12,143,466.

(Continued)

(51) Int. Cl.
*H04L 9/00*　　(2022.01)
*G06F 9/38*　　(2018.01)
(Continued)

(52) U.S. Cl.
CPC ............ *H04L 9/008* (2013.01); *G06F 9/3887* (2013.01); *G06F 21/72* (2013.01); *H04L 9/085* (2013.01); *H04L 9/12* (2013.01); *H04L 9/30* (2013.01)

(58) Field of Classification Search
CPC . H04L 9/008; H04L 9/085; H04L 9/12; H04L 9/30; H04L 2209/122; H04L 2209/46; G06F 9/3887; G06F 21/72
See application file for complete search history.

(56) References Cited

U.S. PATENT DOCUMENTS 8,515,058 B1 *　8/2013　Gentry ................... H04L 9/008
　　　　　　　　　　　　　　　380/28
8,630,422 B2 *　1/2014　Gentry ................. H04L 9/0822
　　　　　　　　　　　　　　　713/193

(Continued)

OTHER PUBLICATIONS

Zhou et al., "HEAD: an FHE-based Privacy-preserving Cloud Computing Protocol with Compact Storage and Efficient Computation", 2022, https://eprint.iacr.org/2022/238 (Year: 2022).*

(Continued)

*Primary Examiner* — Ramy M Osman
(74) *Attorney, Agent, or Firm* — PEARL COHEN ZEDEK LATZER BARATZ LLP

(57) ABSTRACT

A multi-party system comprising a garbler and an evaluator for interactively executing homomorphic SIMD operations using garbled circuits. The garbler and evaluator may each store a unique share of a shared secret key, a ciphertext, and a shared public key. The garbler and evaluator may each partially decrypt the ciphertext using its key share to generate a unique data share. The garbler may linearize and reduce the size of the unique garbler data share. The garbler may send to the evaluator a garbled circuit, a garbling of the linear unique garbled data share, and garbled potential wires for the evaluator to garble its linear unique evaluator data share by oblivious transfer. The evaluator may evaluate the garbled circuit to execute a SIMD program to combine, in parallel, multiple indices of the linear garbler and evaluator unique data shares to efficiently generate an encrypted result of the garbled circuit.

12 Claims, 5 Drawing Sheets

Related U.S. Application Data

(60) Provisional application No. 63/390,007, filed on Jul. 18, 2022, provisional application No. 63/255,062, filed on Oct. 13, 2021.

(51) Int. Cl.

| | |
|---|---|
| *G06F 21/72* | (2013.01) |
| *H04L 9/08* | (2006.01) |
| *H04L 9/12* | (2006.01) |
| *H04L 9/30* | (2006.01) |

(56) References Cited

U.S. PATENT DOCUMENTS

| | | | | |
|---|---|---|---|---|
| 12,039,543 | B2 * | 7/2024 | Abad | H04L 9/3218 |
| 12,143,466 | B2 * | 11/2024 | Micciancio | H04L 9/008 |
| 2013/0216044 | A1 * | 8/2013 | Gentry | H04L 9/008 380/277 |
| 2015/0381350 | A1 * | 12/2015 | Joye | H04L 9/085 380/28 |
| 2018/0276417 | A1 * | 9/2018 | Cerezo Sanchez | H04L 9/008 |
| 2019/0028440 | A1 * | 1/2019 | Eriksson | H04L 63/0485 |
| 2020/0036512 | A1 * | 1/2020 | Vaikuntanathan | H04L 63/08 |
| 2020/0151356 | A1 * | 5/2020 | Rohloff | G06F 21/6245 |
| 2021/0336792 | A1 * | 10/2021 | Agrawal | H04L 9/30 |
| 2021/0342677 | A1 * | 11/2021 | Dalli | G06N 3/092 |
| 2021/0391987 | A1 * | 12/2021 | Badrinarayanan | H04L 9/30 |
| 2021/0399874 | A1 * | 12/2021 | Polyakov | H04L 9/085 |
| 2022/0052834 | A1 * | 2/2022 | Vaikuntanathan | H04L 9/008 |
| 2023/0112840 | A1 | 4/2023 | Micciancio | |
| 2023/0325529 | A1 * | 10/2023 | Sav | H04L 9/0819 726/26 |
| 2023/0344628 | A1 * | 10/2023 | Fernando | H04L 9/30 |
| 2023/0361986 | A1 * | 11/2023 | Genise | G06F 21/72 |
| 2025/0015979 | A1 * | 1/2025 | Weitzner | H04L 63/14 |

OTHER PUBLICATIONS

F'uster-Sabater et al., "Linear solutions for cryptographic nonlinear sequence generator", Oct. 2007, Physics Letters A vol. 369, Is. 5-6, Oct. 1, 2007, pp. 432-437, https://arxiv.org/pdf/1005.0058 (Year: 2007).*

Teranishi et al., "Encrypted Feedback Linearization and Motion Control for Manipulator", Jul. 6-9, 2020, 2020 IEEE/ASME International Conference on Advanced Intelligent Mechatronics. pp. 613-918 (Year: 2020).*

Zhong et al., "Linearization of nonlinear filter generators and its application to cryptanalysis of stream ciphers", Dec. 2015, Journal of Complexity 35 (2016), pp. 29-45, http://dx.doi.org/10.1016/j.jco. 2015.12.003 (Year: 2015).*

Liu et al., Large-Precision Homomorphic Sign Evaluation using FHEW/TFHE Bootstrapping, downloaded from International Association for Cryptologic Research, https://eprint.iacr.org/2021/1337. pdf , Sep. 17, 2022, 29 pages.

* cited by examiner

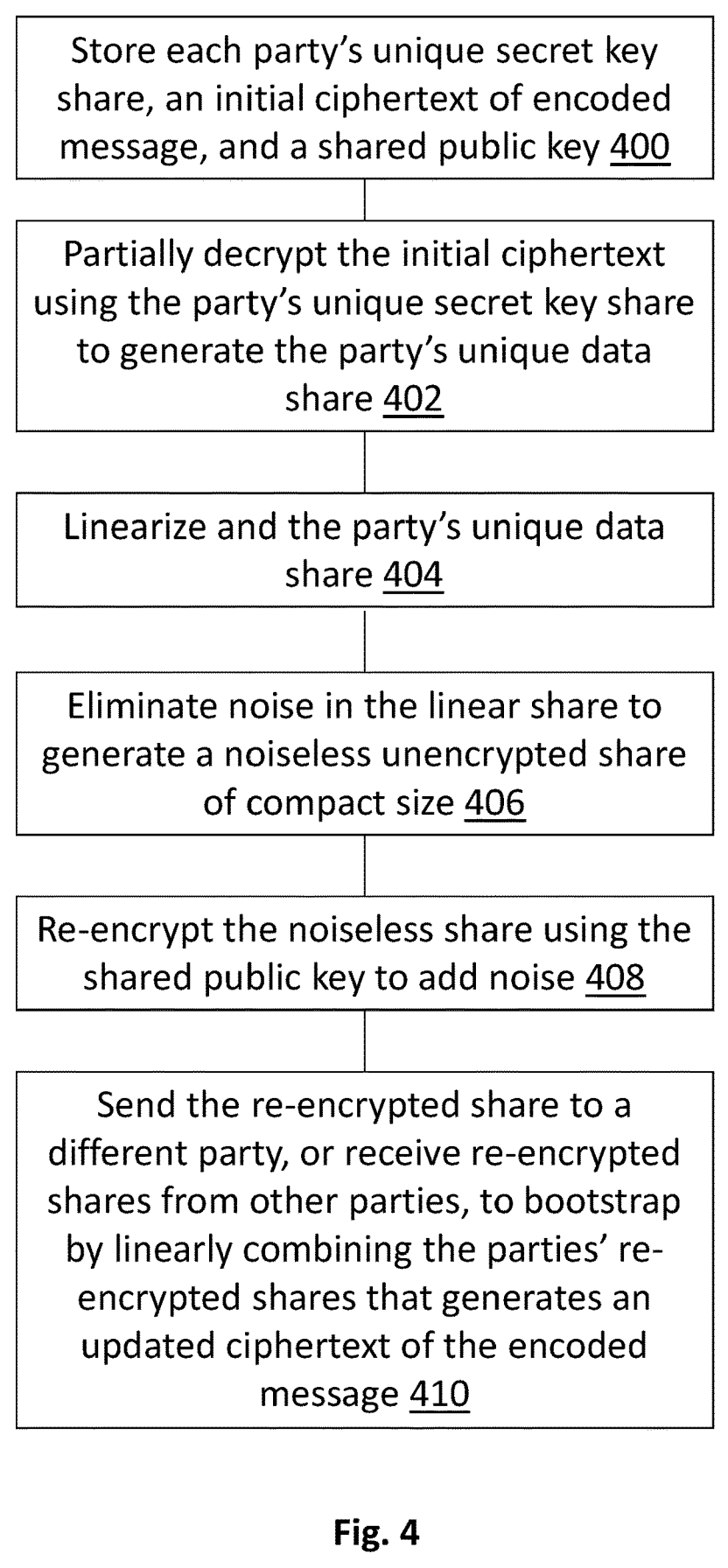

Store each party's unique secret key share, an initial ciphertext of encoded message, and a shared public key 400

Partially decrypt the initial ciphertext using the party's unique secret key share to generate the party's unique data share 402

Linearize and the party's unique data share 404

Eliminate noise in the linear share to generate a noiseless unencrypted share of compact size 406

Re-encrypt the noiseless share using the shared public key to add noise 408

Send the re-encrypted share to a different party, or receive re-encrypted shares from other parties, to bootstrap by linearly combining the parties' re-encrypted shares that generates an updated ciphertext of the encoded message 410

Fig. 4

SIMD INTERACTIVE COMPARISON USING GARBLED CIRCUITS AND INTERACTIVE BOOTSTRAPPING FOR HOMOMORPHIC ENCRYPTION

CROSS-REFERENCE TO RELATED APPLICATIONS

This application is a continuation-in-part of U.S. patent application Ser. No. 17/964,335 filed Oct. 12, 2022, which claims the benefit of and priority to U.S. Provisional Patent Application No. 63/255,062 filed Oct. 13, 2021, and this application also claims the benefit of and priority to U.S. Provisional Patent Application No. 63/390,007 filed Jul. 18, 2022, all of which are incorporated herein by reference in their entirety.

FIELD OF THE INVENTION

Embodiments of the invention relate generally to improving homomorphic encryption. In particular, embodiments of the invention allow efficient Single-Instruction/Multiple-Data (SIMD) operations in a homomorphic encryption space to be executed interactively across multiple parties using multiple respective computer processors.

BACKGROUND OF THE INVENTION

Homomorphic encryption provides data security that allows computer program operations to be executed on encrypted data, without revealing its underlying unencrypted data, to yield an encrypted result. Homomorphically encrypted results can be decrypted, only with a secret key, to produce the same result obtained if the operations were performed on the plaintext, unencrypted data. Without the secret key, the underlying unencrypted data remains secret, allowing homomorphic encryption programs to be collaboratively executed interactively among multiple parties, even when one or more of those parties is insecure or untrusted. Homomorphic encryption, however, adds extra layers of computations on top of operations that can become computationally cumbersome and significantly decrease processing efficiency.

Single-Instruction/Multiple-Data (SIMD) operations address this problem by increasing efficiency using parallelized operations across multiple data points to improve program speed. Not all homomorphic encryption operations, however, can be executed using SIMD operations. Packed SIMD fully homomorphic encryption (FHE) protocols, such as, Brakerski-Gentry-Vaikuntanathan (BGV) and Brakerski-Fan-Vercauteren (BFV), for example, typically only allow linear SIMD operations (SIMD additions and SIMD multiplications), while these schemes' native arithmetic have trouble computing a simple non-linear operation (e.g., a SIMD comparison $>$, $<$, or $=$) that usually require polynomial approximations.

For more non-linear operations in HE space, state of the art homomorphic programs typically use either FHEW/TFHE-schemes, which do not support SIMD processing and can further require multiple bootstrapping operations for each comparison, use polynomial approximations of operations, or use other multi-party computation (MPC) methods for specialized security models, leading to inefficient execution and slow processing speeds.

State-of-the-art systems therefore either operate using SIMD but cannot compute non-linear operations or compute non-linear operations but cannot operate using SIMD. There is therefore a need in the art of encryption to use SIMD for executing non-linear operations under homomorphic encryption to increase computer speed and efficiency.

SUMMARY OF EMBODIMENTS OF THE INVENTION

Embodiments of the invention overcome this need in the art of encryption to provide SIMD programming for executing interactive non-linear operations under homomorphic encryption to increase computer speed and efficiency. Embodiments of the invention take SIMD FHE program with efficient parallelized execution, but with native capabilities unable to perform non-linear operations (e.g., BGV or BFV), and embed within the SIMD FHE program a garbled circuit able to perform the non-linear operation interactively between a garbler device and an evaluator device. This technique serves to wrap a garbled circuit to perform interactive operations in a SIMD FHE package and exploit both the efficiency benefits of SIMD and the non-linear operation capabilities of garbled circuits.

In some embodiments, however, embedding a garbled circuit into a SIMD FHE program may significantly reduce processing efficiency. To combine SIMD FHE and garbled circuits efficiently, embodiments of the invention may linearize (e.g., using distributed rounding) data shares input by the garbler and evaluator into the garbled circuit to allow the size of the data shares manipulated by the SIMD FHE operation to be reduced to a compact size (e.g., by modular reduction). The garbler and evaluator each linearizes and reduces the size of its respective data share, in parallel and independently, without access to the other's data share, and thus without inefficient communication therebetween. Once each party's data is linearized and reduced in size, these compact SIMD FHE data shares may be transferred in the multi-party garbled circuit for executing the non-linear operation efficiently under the SIMD FHE protocol.

According to one or more embodiments, there is a multi-party system comprising a garbler device and an evaluator device, a computer implemented method, and a non-transitory computer-readable storage medium storing instructions to execute one or more processors, each of which performs SIMD operations using garbled circuits under a FHE protocol interactively in the multi-party system. In some embodiments, the system, method and storage medium may provide the dual-benefits of increased computational speed and efficiency due to SIMD parallelized operations and broad operational capabilities (allowing non-linear operations, such as, comparisons) due to garbled circuits capabilities.

In some embodiments, the garbler device, in communication with an evaluator device, in a system of two or more parties, may store a unique garbler secret key share $s_i$, $i=0$ of a shared secret key $s=\Sigma_i s_i$, a ciphertext of one or more values encrypted in a SIMD FHE protocol, and a shared public key encrypting the ciphertext (e.g., the shared public key corresponding to and/or decrypted by the shared secret key). The garbler device may partially decrypt the ciphertext using the unique garbler secret key share $s_0$ to generate a unique garbler data share, $share_0$. The garbler device may linearize the unique garbler data share from a non-linear data share (e.g., using distributed rounding) and reduce the linear unique garbler data share (e.g., modulo p, where p is where p is a plaintext modulus of each of the one or more unencrypted values) to be combined with other parties' shares at compact size. In some embodiments, maximal share size reduction (e.g., modulo p) may eliminate noise in the linear share to generate a noiseless (unencrypted) share. The garbler may thus generate and share an encrypted mask with the evaluator to combine both parties' shares under the mask. The garbler device may generate, and send to the evaluator, a garbled circuit defining an operation (e.g., a non-linear operation such as a comparison) on the one or more values (e.g., to each other or to a fixed value), a garbling of the linear unique garbled data share, a garbled mask, and garbled potential wires by which the evaluator is adapted to garble its linear unique evaluator data share by oblivious transfer. The garbler may define the garbled circuit, evaluated by the evaluator device, to execute a SIMD program to combine, in parallel, multiple indices of the linear garbler and evaluator unique data shares to generate an encrypted result of the garbled circuit operation on the one or more encrypted values.

In some embodiments, the evaluator device, in communication with a garbler device, in a system of two or more parties, may store a unique evaluator secret key share $s_i$, $i=1$ of a shared secret key $s=\Sigma_i s_i$, a ciphertext of one or more values encrypted in a SIMD FHE protocol, and a shared public key encrypting the ciphertext (e.g., the shared public key corresponding to and/or decrypted by the shared secret key). The evaluator device may partially decrypt the ciphertext using the unique evaluator secret key share $s_1$ to generate a unique evaluator data share, share$_1$. The evaluator device may linearize the unique evaluator data share from a non-linear data share (e.g., using distributed rounding) to enable the unique evaluator data share to be combined with other parties' shares at compact size (e.g., modulo p). The evaluator device may receive from the garbler device, a garbled circuit defining an operation on the one or more values, a garbling of the linear unique garbled data share, and garbled potential wires. The evaluator device may garble its linear unique evaluator data share by the garbled potential wires of the garbled circuit using oblivious transfer. The evaluator device may evaluate the garbled circuit using a SIMD execution to combine, in parallel, multiple indices of the linear garbler and evaluator unique data shares to generate an encrypted result of the garbled circuit operation on the one or more encrypted values.

In some embodiments, the multi-party system may include more than two parties. The operation may be iteratively executed pair-wise between pairs of parties in a linked sequence of the more than two parties. In each iteration of the iterative pair-wise execution, the evaluator device from a previous iteration may be reset to be the garbler device in a current iteration and a third party of the more than two parties may be set to be a new evaluator device in the current iteration.

According to one or more embodiments, there is a multi-party system, a computer implemented method, and a non-transitory computer-readable storage medium storing instructions to execute one or more processors, for performing interactive bootstrapping in a FHE protocol. FHE schemes typically use noisy encryptions to provide security. Each time homomorphic operations are executed on ciphertexts, the noise increases and the ciphertext quality decreases. Bootstrapping may be used to convert an "exhausted" ciphertext (having relatively high and/or above-threshold noise preventing further homomorphic operations to be performed on it) to a substantially equivalent "refreshed" ciphertext (having relatively low and/or below-threshold noise enabling further homomorphic operations to be performed on it). Additionally or alternatively, bootstrapping may be used for other purposes including to turn approximate homomorphic encryption schemes into fully homomorphic encryption schemes, increase the plaintext modulus of a ciphertext, switch between different encryption keys, and/or switch between different FHE schemes.

Each party in the multi-party system may collaborate to interactively bootstrap in a FHE protocol. Each party may store a unique secret key share $s_i$ of a shared secret key $s=\Sigma_i s_i$, an initial (e.g., exhausted) FHE ciphertext c of an encoded message (e.g., with insufficient computational depth to perform FHE operations thereon), and a shared public key P encrypting the initial ciphertext. Each of the parties may, in parallel and without communication therebetween, partially decrypt the initial ciphertext using the unique secret key share $s_i$ to generate a unique data share, share$_i$, linearize (e.g., by distributed rounding) the unique data share (e.g., from a non-linear data share), eliminate noise in the linear share to generate a noiseless (unencrypted) share $c_i$ of compact size, reduce the share size by taking modulo p of the linear shares (e.g., where p is the unencrypted plaintext modulus, i.e., the modulus of the unencrypted encoded message), re-encrypt the noiseless share $Enc_P(c_i)$ using the shared public key to add noise (e.g., that enhances computational depth, encrypting and increasing the share size by modulus Q, where Q is the modulus of the FHE protocol, $p \ll Q$). Each party may then send its re-encrypted share to a different party, or receive re-encrypted shares from the other of the two or more parties, to bootstrap by linearly combining the re-encrypted shares of the two or more parties to generate an updated (e.g., refreshed) ciphertext $c'=\Sigma_i Enc_P(c_i)$ of the same encoded message (e.g., with sufficient computational depth to perform FHE operations thereon).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2A is a schematic illustration of an example computing device for executing interactive homomorphic programs in a multi-party system, according to some embodiments of the invention;

FIG. 4 is a flowchart of a method for interactive multi-party bootstrapping in a FHE protocol, according to some embodiments of the invention.

Figure 1:
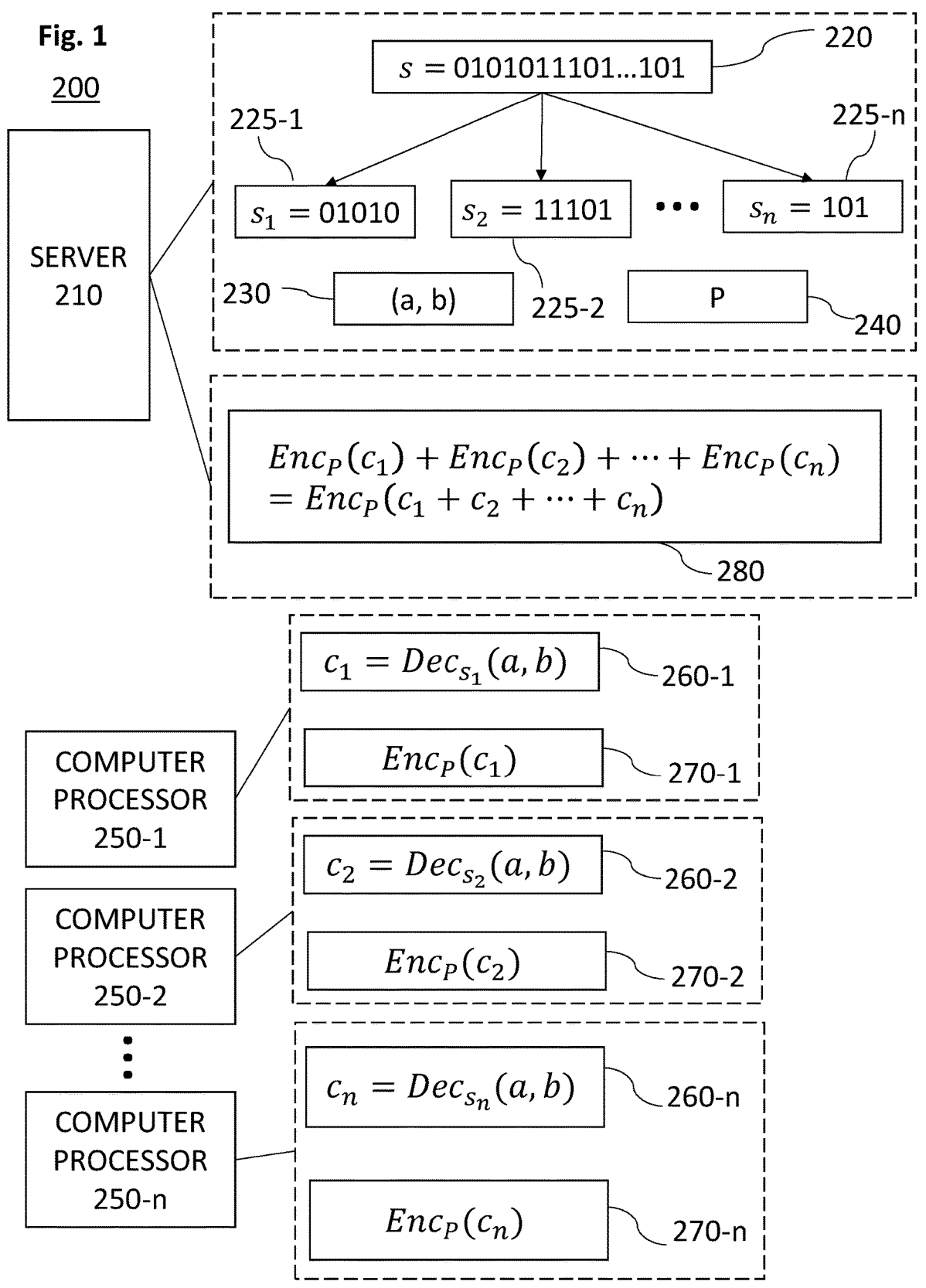
FIG. 1 is a schematic illustration of a multi-party system for executing interactive homomorphic programs, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

Some SIMD FHE schemes (e.g., based on RLWE such as BGV or BFV), while efficient, only allow for linear SIMD additions and SIMD multiplications, but are unable to perform more complex non-linear SIMD operations, such as SIMD comparisons, that usually require polynomial approximations or switching to schemes which handle Boolean operations more easily, e.g., FHEW/TFHE schemes.

Garbled circuits, on the other hand, can handle non-linear operations, such as comparisons, e.g., since they work on the bit-level, while operating at faster run times than FHEW/TFHE since they usually only rely on block ciphers like AES and oblivious transfer. However, garbled circuits are typically inefficient for deep computations because, for example, the encoded circuits can become quite large, and/or each circuit conventionally requires the garbler and/or the evaluator to communicate adding layers of processing to ensure inter-party security causing significant delays in processing speed.

Embodiments of the invention significantly increase the speed and efficiency of executing FHE programs by integrate garbled circuits into SIMD FHE programs to exploit the dual benefits of garbled circuit's non-linear computing capabilities and SIMD FHE programs' efficient parallelized program execution. Systems and methods are provided for performing SIMD operations in homomorphic encryption space using garbled circuits interactively between two parties—a garbler device and an evaluator device. Embodiments of the invention may increase FHE program speed proportionally to the size of the multiple datablocks on which SIMD operations are parallelized. For example, an interactive SIMD FHE program that parallelizes operations on N indices i=1, . . . , N generates an N times speed up in program processing e.g., per message.

Interactive computations between the two parties involve a server splitting a shared secret key, $s = s_0 + s_1$ into two separate secret key shares, $s_0$ and $s_1$, and transmitting to each of the parties: (i) a ciphertext encrypted using an associated publicly available homomorphic encryption key pk; (ii) a unique share of the split secret key shares $s_i$; and (iii) the public encryption key pk. The garbler device is the only interactive party with possession of its unique garbler secret key share $s_0$, the evaluator device is the only interactive party with possession of its unique evaluator secret key share $s_1$, and both parties have possession of the combined shared public key pk. The ciphertext encrypts one or more values or messages (m and/or $\alpha$) for a non-linear operation (e.g., comparison $m > \alpha$, or equivalently the sign of the difference $m - \alpha$). Each party computes a partial decryption of the ciphertext using its unique private key share $s_0$ and $s_1$ to generate a unique data share $share_i = i \cdot b + a s_i$, respectively.

For increased efficiency, initially and prior to executing the garbling circuit, each party may linearize its partially decrypted data share to convert the data share from a non-linear polynomial to linear data (e.g., by distributed rounding). After linearization, each party significantly reduces the size of its data share to a relatively more compact data size (e.g., reduced from mod q to mod p, where p is the plaintext modulus of the one or more unencrypted values and q is the modulus of the FHE scheme, q>>p, so that the reducing the share size from mod q to mod p decreases the computational load and increases efficiency). Linearization and size reduction allows the data shares to be combined, later by the garbler circuit, efficiently at compact size. The parties linearize their respective data shares independently, in parallel, without communication therebetween. Avoiding inter-party communication to linearize data shares independently eliminates extra computational layers for secure interaction, including re-encryption and transmission, significantly reducing computational time and complexity. Once linearized and size reduced, the compact linear data shares may be efficiently combined (e.g., under the security of a mask) using SIMD computations by the garbled circuit. The garbled circuit is programmed to execute the non-linear operation on the message values (e.g., comparison $m > \alpha$). Oblivious transfer in the garbled circuit allows the garbler and evaluator to combine their compact linear data shares without either party knowing what data the other party contributes. The evaluator evaluates the garbled circuit to execute the non-linear operation on the combined garbler and evaluator inputs. The evaluator then outputs a ciphertext encrypting the operation result c of the SIMD execution of the non-linear operation under homomorphic encryption.

Inter-party communication and combination may be executed under the security of a mask. The garbler may generate the mask and embed it in the garbled circuit that combines the two parties' unique data shares under the mask (e.g., see EQN 1). Once the circuit is complete, the evaluator device may unmask the encrypted result to generate the output ciphertext encrypted under the shared secret key.

An example SIMD program for executing interactive operations under homomorphic encryption is shown in Table 1. In Table 1, the left-hand side of the table shows operations executed by a first party server 0, $S_0$ (e.g., the garbler device using computer processor 250-1 of FIG. 1) and the right-hand side of the table shows operations executed by a second party server 1, $S_1$ (e.g., the evaluator device using computer processor 250-2 of FIG. 1). Additional parties, up to any number n (e.g., operating respective computer processor(s) 250-3, . . . , 250-n of FIG. 1), may collaborate to sequentially execute the operation in a pair-wise sequence of garbler-evaluator party pairs. The operation may be iteratively executed pair-wise between each garbler-evaluator pair in the sequence, wherein in each iterative pair-wise execution, the evaluator device from a previous iteration (e.g., operating respective computer processor(s) 250-i) is reset to be the garbler device in a current iteration and a next party in the sequence of parties (e.g., operating respective computer processor(s) 250-i+1) is set to be the evaluator device in the current iteration. Each iterative pair-wise execution operates under a different shared secret key $s = \Sigma_i s_i$ combining the unique the garbler secret key share of the garbler device and the evaluator secret key share of the evaluator device in a current iteration. In each iteration, switching encryption to correspond to the different shared secret key may be performed by key switching, e.g., using a key switching technique such as proxy re-encryption (PRE). Each garbler circuit for each iterative pair-wise execution may be the same or different.

In the example of Table 1, BGV encryption is used, although other SIMD FHE protocols may be used such as BFV. For example, Table 1 can be adapted to support BFV encryption by switching a BFV ciphertext input to a BGV ciphertext homomorphically with standard techniques (e.g., scalar multiplications). Comments regarding correctness are provided and interactions are described by arrows in the middle of the table.

The garbler and evaluator may interactively execute the example SIMD program of table 1 to compute an interactive functional bootstrapping of a comparison $m > \alpha$ e.g., for some fixed value, e.g., scalar $\alpha \in \mathbb{Z}_p$. The comparison operation is provided only for example, and any other non-linear operation may be used. Table 1 describes the protocol version where $S_0$ knows $\alpha$. Adapting the protocol to the case where only $S_1$ knows the fixed value $\alpha$ (have $\alpha$ subtracted from $S_1$'s share), both $S_0$ and $S_1$ know the fixed value $\alpha$ (have $\alpha$ encrypted by a third party), or where neither knows the fixed value $\alpha$ (have $\alpha$ subtracted homomorphically with it encrypted as an input).

the parties to reduce the size (e.g., mod p, where p is the plaintext modulus of each of the one or more unencrypted values) to be able to later add the shares in the garbled circuit over the integers at compact size (e.g., without taking the result modulo q, where q is the modulus of the FHE protocol, $p \ll q$). Each party can independently, without communication therebetween, reduce its share modulo p (line 2 of Table 1) and can perform the modulo p discrete

TABLE 1

| $S_0$ on $(s_0, ct)$ | $ct = (a, b)$ is a BGV ct under $sk = s_0 + s_1$ | $S_1$ on $(s_1, ct)$ |
|---|---|---|
| 1: $x \leftarrow \lceil as_0 \rfloor_{dist}$ | $x + y = pe + m \in \mathbb{Z}^n$ | $y \leftarrow \lceil b + as_1 \rfloor_{dist}$ |
| 2: $2 \leftarrow x - \alpha \pmod{p}$ | $x + y = m - \alpha \in \mathbb{Z}_p^k$ | $y \leftarrow y \pmod{p}$ |
| 3: $3 \leftarrow DFT(x)$ | $DFT(m) - \alpha = x + y \in \mathbb{Z}_p^k$ | $y \leftarrow DFT(y)$ |
| 4: $mask \leftarrow \{0, 1\}^k$ | | |
| 5: $mask' \leftarrow (-1)^{mask} \in \{\pm 1\}^k$ | | |
| 6: $\widehat{mask} \leftarrow DFT^{-1}(mask')$ | | |
| 7: $c'' \leftarrow E_p(\widehat{mask})$ | | |
| 8: $(\hat{w}_0^j, \hat{w}_1^j)_j \leftarrow garble(\lambda)$ | random wires for $S_1$'s input | |
| 9: $\tilde{C}, \tilde{x}, \widetilde{mask} \leftarrow garble(C, x, mask)$ | | |
| 10: | $\xrightarrow{\tilde{C}, \tilde{x}, \widetilde{mask}, c''}$ | |
| 11: | $(\tilde{\omega}_0^j, \tilde{\omega}_1^j) \rightarrow \boxed{OT} \leftarrow y$ | |
| 12: | $\boxed{OT} \rightarrow \tilde{y}$ | |
| 13: | | $z'' \leftarrow Eval(\tilde{C}, \tilde{x}, \tilde{y}, \widetilde{mask})$ |
| 14: | $z'' = comp \oplus mask$ | |
| 15: | | $z' \leftarrow (-1)^{z'' \oplus 1} \in \{\pm 1\}^k$ |
| 16: | | $z \leftarrow DFT^{-1}(z')$ |
| 17: | $c'$ encrypts $(-1)^{comp_j \oplus 1}$ | $c' \leftarrow z \cdot c'' \in R_Q^2$ |
| 18: | | $c' \leftarrow c' + E_p(0) \in R_Q^2$ |
| 19: | | $gcd(p, 2) = 1$ so $2^{-1} \in R_p$ |
| 20: | $\xleftarrow{c}$ | $c \leftarrow (c' + 1)/2$ |
| 21: | $c$ encrypts $comp_i$ in slot $i$ | |

BGV protocol: We use distributed rounding: $\lceil z \rfloor_{dist}$ adds q/2 if $|z| \geq q/4$. The circuit $C(x, y, mask)$ first adds x and y, then compares with a fixed value, then adds a new binary mask, mask.
Note,
$DFT^{-1}$ and DFT map coefficients to slots and slots to coefficients, respectively.

Each party $S_0$ and $S_1$ may store a unique secret key share $s_i$ of a shared secret key $s = \Sigma_i s_i$, a ciphertext, $$ct = (a, b) \in R_q^2,$$

encrypting a message of one or more values under a shared secret key, $s = s_0 + s_1 \in R$ (e.g., with small norm) in a SIMD FHE protocol, and a shared public key encrypting the ciphertext (e.g., the shared public key corresponding to/decrypted by the shared secret key). The next step can be for each party $S_0$ and $S_1$ to compute independently, without communication therebetween, a partial decryption of the ciphertext using its secret key share $s_0$ and $s_1$ to generate a data share $share_0$ and $share_1$, respectively. Each party $S_0$ and $S_1$ may then perform linearization (e.g., by distributed rounding) on each message share, respectively (line 1 of Table 1) independently, without communication therebetween. For example, party i computes $share_i = i \cdot b + as_i$, then $[share_i]_{dist}$ where $[z]_{dist}$ is the linearization operation (e.g., distributed rounding described herein). Linearization allows Fourier transform, DFT, on its modulo-p share (line 3 of Table 1). At this point, the shares can be added modulo p to get the unpacked plaintext message.

The garbled circuit computation begins in line 4 of Table 1, where $S_0$ is the garbler with inputs $$x \in \mathbb{Z}_{\cdot p}^k$$

and $mask \in \{0,1\}^k$, where k is the number of plaintext slots, and $S_1$ is the evaluator with input $$y \in \mathbb{Z}_{\cdot p}^k$$

The garbled circuit may be performed interactively under the security of a mask encryption. The garbler, $S_0$, generates a mask (lines 4-6 of Table 1), e.g., by first generating a binary mask randomly, in a cryptographically-strong manner (e.g., using a NIST-approved 128-bit secure PRNG) (line 4 of Table 1), converting it to a signed mask (encoding it in $\{\pm 1\}$) (line 5 of Table 1), then creates a packed FHE plaintext by calling the inverse DFT modulo p on the resulting vector (line 6 of Table 1). Line 7 of Table 1 shows the garbler then encrypts this ciphertext under the shared public key that corresponds to the shared secret key, $s=s_0+s_1$. Lines 8 and 9 of Table 1 show the garbler garbling the circuit where $$(\tilde{w_0^j}, \tilde{w_1^j})_j$$

are the garbled potential wires for the evaluator's input $$y \in \mathbb{Z}_{*p}^k$$

and $\tilde{x}$, $\widetilde{mask}$ represent the garbler's input and C is a Boolean circuit which performs the following in parallel for each $(x_i, mask_i, y_i)_{i=1, \ldots, k}$:

$$z_i'' \leftarrow [(x_i + y_i \bmod p) > 0] \oplus mask_i \in \{0, 1\}. \qquad \text{EQN. 1}$$

(Table 1 abbreviates the vector of comparison bits $(x_i+y_i \bmod p)_i \in \{0,1\}^k$ as comp; tildes indicate garbled data.)

Next, the garbler engages the evaluator in an oblivious transfer (OT) protocol (lines 10-12 of Table 1). The garbler sends over its garbled inputs to the evaluator—the garbled linear reduced data share $\tilde{x}$, garbled mask $\widetilde{mask}$, garbled circuit $\tilde{C}$, and/or encryption of the FHE-encoded mask c" (line 10 of Table 1). The garbler provides the evaluator with garbled potential wires $$(\tilde{w_0^j}, \tilde{w_1^j})_j$$

for the evaluator to garble its linear unique evaluator data share $\tilde{y}$, by oblivious transfer (OT), without revealing to the garbler which element was queried (the value of the pre-garbled linear unique evaluator data share y) (lines 11-2 of Table 1).

The evaluator, $S_1$, then evaluates the garbled circuit, operating on the garbled masked linear unique garbler and evaluator data shares $\tilde{x}$ and $\tilde{y}$, to get an evaluation output that is a masked encryption of the combination of the linear garbler and evaluator unique data shares (e.g., vector z" $\in \{0,1\}^k$ in EQN. 1) (lines 13-14 of Table 1). The evaluator uses SIMD processing to combine, in parallel, multiple indices $i=1, \ldots, k$ of the linear garbler and evaluator unique data shares $((x_i, mask_i, y_i)_{i=1, \ldots, k})$ to efficiently generate the encrypted result z" of the garbled circuit (EQN. 1). The evaluator may then switch from a binary mask $\{0,1\}^k$ to encode this vector in a signed mask $\{\pm 1\}^k$ by executing $z_i' \leftarrow (-1)^{z_i'' \oplus 1}$, in parallel, for each index $i=1, \ldots, k$ (line 15 of Table 1). Next, the evaluator may encode the previous vector, z', in a FHE plaintext with the inverse DFT modulo p (line 16 of Table 1) and performs a plaintext-ciphertext multiplication with the result and the encrypted mask c" (e.g., and re-randomize the ciphertext by $E_P(0)$ for security) (lines 17-18 of Table 1). Next, the evaluator performs an affine transformation to map the unmasked result from $\{\pm 1\}^k$ to $\{0,1\}^k$ in the slots of the FHE ciphertext (lines 19-20 of Table 1). Finally, the evaluator sends a ciphertext c under homomorphic encryption of the result of executing the SIMD program for executing interactive operations in the garbled circuit (line 21 of Table 1).

In some embodiments, the garbler device and the evaluator device each linearizes its respective share by distributed rounding. An example of distributed rounding may be performed as follows. An input to the distributed rounding algorithm, denoted as DistRound, may be a (e.g., BGV or BFV) ciphertext $$(a, b) \in R_q^2,$$

where, for example, each a and b are integer vectors of dimension N, N is a power of two, representing a polynomial in $R_q = \mathbb{Z}_q[X]/(X^N+1)$ where $\mathbb{Z}_Q$ is the set of integers modulo q. Further, the integers modulo q can be represented with balanced residues, e.g., $$\mathbb{Z}_q = \{-\frac{q-1}{2}, \ldots, -1, 0, 1, \ldots, \frac{q-1}{2}\}$$

if q is odd. Given these two polynomials, the following can be computed on each coefficient $c \in \mathbb{Z}_q$ in parallel: a fixed value (e.g., q/2) is added if an absolute value of the partial decryption of the ciphertext is greater than a predefined value, (e.g., $|c|>q/4$) and return c, e.g.:

$$DistRound(c): \text{Return } c + \frac{q}{2} \bmod q \text{ if } |c| > q/4; \qquad \text{EQN. 2}$$
$$\text{Otherwise, return } c$$

The significance of DistRound(·) is when $|a+bs \bmod q| \ll q$ since it can allow for additive two-party FHE decryption over the integers. Distributed rounding may be performed as disclosed in U.S. patent application Ser. No. 17/964,335 filed Oct. 12, 202, published as U.S. Patent Application Publication No. 2023/0112840 on Apr. 13, 2023, the disclosure of which is incorporated herein by reference in its entirety.

Operations, equations and symbols are shown as examples, and other implementations of these as well as protocols, programs, and/or steps (or orders thereof) may also be used.

Bootstrapping can be an important operation in homomorphic encryption schemes and/or when performing operations on homomorphically encrypted data. Embodiments of the invention may use bootstrapping to turn approximate homomorphic encryption schemes into fully homomorphic encryption schemes, reduce the noise of the encryption, increase the plaintext modulus of a ciphertext, switch between different encryption keys, switch between different FHE schemes, and/or other purposes. Switching between different FHE schemes may require some additional operations to consider different encodings used by BGV, BFV, Cheon-Kim-Kim-Song (CKKS) and other schemes. Typically, bootstrapping is computationally intensive. As such, it can be desirable to perform computationally efficient bootstrapping in homomorphic encryption.

Embodiments of the invention provide interactive multi-party bootstrapping in a FHE protocol. In a system with multiple (N) parties, each party may store a unique secret key share $s_i$ of a shared secret key $s=\Sigma_i s_i$, an exhausted FHE ciphertext c of an encoded message with insufficient computational depth to perform FHE operations thereon, and a shared public key encrypting the ciphertext. The party may partially decrypt the ciphertext using the unique secret key share $s_i$ to generate a unique data share, $share_i$, linearize the unique data share to enable shares to be combined at compact size, eliminate noise in the linear share to generate a noiseless unencrypted share $c_i$ of compact size, re-encrypt the noiseless share $c_i$ using the shared public key to add noise (e.g., that enhances computational depth) $Enc_p(c_i)$. The party may then send the re-encrypted share to a different party, or receive re-encrypted shares from others of the two or more parties, to bootstrap by linearly combining the re-encrypted shares of the two or more parties that generates a refreshed ciphertext $c'=\Sigma_i Enc_p(c_i)$ of the encoded message with sufficient computational depth to perform FHE operations thereon.

In one example, a client (a first party $S_0$) sends encrypted data in a message to a server (a second party $S_1$) to run operations, for example, a machine learning (ML) program. The server outputs an encrypted result of the ML program as an exhausted ciphertext (a,b). Embodiments of the invention bootstrap the exhausted ciphertext (a,b) to generate a refreshed ciphertext (a',b'). Some embodiments of the invention perform rerandomization to obfuscate the refreshed ciphertext (a',b'), e.g., with an encryption of zero (0) or other mask or noise. Rerandomization provides a double-blind environment in which neither the client (providing the data) nor the server (providing the ML program operating on the data) have access to the other's unencrypted information. For example, the client may submit its encrypted data to the server, the server unable to access the unencrypted data because it does not have the client's secret key. The server then applies its ML program to the ciphertext, bootstraps to refresh the ciphertext and rerandomizes to obfuscate the refreshed ciphertext, ensuring the client cannot know its ML program.

In some embodiments, the invention can involve an interactive method for bootstrapping ciphertexts encrypted using an FHE protocol, such as, BGV, BFV or CKKS, a homomorphic encryption scheme for approximate number arithmetic. In some embodiments, the invention can involve determining additive shares of a secret key to input to two or more semi-honest computer processors. The two or more semi-honest computer processors, having each received as input additive shares of the secret key, can each receive input of a common ciphertext, use the share of the secret key to decrypt the common ciphertext, resulting in the same (e.g., approximately the same) plaintext message underlying the ciphertext. The two or more semi-honest computer processors can compute encryption of the same (e.g., approximately the same) plaintext message underlying the ciphertext, but with a modulus larger than the ciphertext modulus. This may have the effect of increasing a plaintext space and/or reducing a relative noise.

Typically, in homomorphic encryption, the set of integers modulo a is denoted as $Z_a$, represented as integers in the range, e.g., $\{-q/2, \ldots, q/2\}$. For any power of two $N=2^k$ (k being an integer), $R=Z[X]/(X^N+1)$ may denote the corresponding cyclotomic ring, and $R_q$ may denote the quotient ring with coefficients reduced modulo q. The absolute value of a ring element |c| may be defined as the magnitude of the largest coefficient, e.g., the norm $|\vec{c}|_\infty$ of the corresponding vector. For example, a ciphertext with modulus a may include a pair of cyclotomic ring elements $$(a, b) \in R_q^2.$$

A decryption keys may be a ring element $s \in R$ with small (e.g., less than 64 bits) coefficients. Small keys may be useful to, for example, perform rounded division, sign evaluation and/or comparison operations. In some embodiments, the decryption key is any $s \in R_q$ with possibly large (e.g., greater than 64 bits) entries.

Typically, in homomorphic encryption, upon input of a ciphertext (a,b) and a decryption key s, a BGV, BFV or CKKS approximate decryption function can be performed (e.g., by a computing device 100A as shown below in FIG. 2A) as follows:

1) computing the ring element $c=as+b \pmod{q} \in R_q$;
2) interpreting c(X) as a polynomial in C[X] with coefficients in $\{-q/2, \ldots, q/2\} \subset Z$; and
3) evaluating c(X) at the primitive complex roots of unity $(c(\omega), c(\omega^3), \ldots, c(\omega^{n-1}))$ to obtain n/2 complex numbers.
4) mapping n/2 complex numbers to n real numbers and rounding to integers.

Embodiments of the invention may use ciphertexts with different moduli $q<Q$. The encryption and decryption may also include a scaling factor $\Delta$ used to represent fixed point numbers. The first step (and typically not the remaining steps) of a decryption procedure for the encryption can depend on the modulus q. In the first step of the decryption, c can be recovered. Once c is recovered, then the remaining steps of the decryption procedure can be independent of the modulus q and/or the secret key s, which may allow the steps to be done in parallel.

Embodiments of the invention may provide a system for distributing bootstrapping in homomorphic encryption schemes.

In an example FHE protocol, such as, BGV, BFV or CKKS, assume $s \in R$ be a secret key modulo q and P a public key modulo Q (here P may correspond to the same secret key s, or a different one (under key switching e.g., PRE): this makes no difference for the example or the applicability of embodiments of the invention).

Embodiments of the invention may solve the following example bootstrapping problem: Given an exhausted ciphertext $$(a, b) \in R_q^2$$

which encrypts a message $c=Dec_s(a,b)=as+b$ (with $|c|<\beta$), how to obtain a refreshed encryption $Enc_p(c)$ of the same (encoded) message c under P. As will be known to those skilled in the art, $\beta$ may represent a noise parameter typically fixed based on security standards.

Embodiments of the invention may solve the above example bootstrapping problem using a method (e.g., described in reference to FIG. 4) where two servers $S_0$, $S_1$ hold shares of the secret key modulo q. The shares may be determined based on EQN 3 below:

$$s = s_0 + s_1 \pmod{q} \qquad \text{EQN. 3}$$

With reference to the method of FIG. 4 and system 200, this example sets n=2, and uses two computer processors located on servers $S_0$, $S_1$. A convention of counting from zero, e.g., $S_0$ for the first server and $S_1$ for the second server may be used to aid in the mathematics when referring to a general index $i \in \{0,1\}$, as can be seen.

The servers may also receive the public key P modulo Q, and receive the input ciphertext (a,b), from a client C (in this example, server 210 of FIG. 1, the server may be referred to as the client C). Without any interaction, e.g., independent of one another, the servers $S_0,S_1$ may compute two respective encryptions $Enc_P(c_0),Enc_P(c_1)$ and send them to the client C. This may correspond to operation 408 of FIG. 4.

The client C may compute a homomorphic sum according to EQN. 4 below:

$$Enc_P(c_0) + Enc_P(c_1) = Enc_P(c_0 + c_1) \qquad \text{EQN. 4}$$

Here, $Enc_P$ may be a BGV, BFV or CKKS encryption using a larger modulus Q, or any other linearly homomorphic public key encryption scheme.

Here, $Enc_P$ may be a BGV, BFV or CKKS encryption using a larger modulus Q, or, any other linearly homomorphic public key encryption scheme, as the computation performed by the servers use $Enc_P$ as a black box.

Example 1: Protocol for BGV, BFV or CKKS Bootstrapping

Let $i \in \{0, 1\}$ be the index of server $S_i$. Each server may perform the following operations:
1) Global parameters: key share $s_i \in R_q$, public key P (mod Q), hash function $$H{:}R_q^2 \to R_q$$

modelled as a random oracle;
2) Common input (for both servers): ciphertext $$(a, b) \in R_q^2;$$

3) Compute a randomizer r=H(a,b);
4) Compute $c_i=as_i+i\cdot b+(-1)^i\cdot r$ (mod q) (equivalently, the two servers compute $c_0=as_0+r$ and $c_1=as_1+b-r$);
5) If $|c_i|>q/4$, then $c_i \leftarrow c_i+(q/2)(\text{mod } q)$ (the operations are performed coordinate-wise, on each coefficient of $c_i$ independently; SIMD execution may parallelize multiple coordinate execution to increase efficiency); and
6) Return $Enc_P(c_i)$.
In the above example protocol, the value $c_i$ may be computed as a polynomial with integer coefficients bounded by $|c_i| \leq q/2$. Upon receiving $Enc_P(c_0)$ and $Enc_P(c_1)$, the client C (e.g., server 210 of FIG. 1) adds them up to obtain $Enc_P$ $(c_0+c_1)$.

In this example, each coefficient of $c_i$ may satisfy $|c_i| \notin$ $(q/4 \pm \beta)$, where $|c| < \beta$ by assumption. When, q is larger by approximately 40 bits than β, the protocol may reduce a total noise of the bootstrapping. For typical implementations of BGV, BFV or CKKS, which typically perform all operations in the residue number system (RNS), this relationship between q and β suggests an extra RNS modulus can be added to the modulus, typically resulting in two RNS limbs in the ciphertext before calling an interactive bootstrapping procedure such as described herein, as compared to a single RNS limb in the case of noninteractive BGV, BFV or CKKS bootstrapping.

Example 2: Protocol Based on Threshold FHE

In this example, it is assumed that there is an existing protocol (e.g., the method of FIG. 4) with two parties (although any number of parties may be used). In this example, each party has a secret key share generated from the ternary uniform distribution. The secret shares may be labelled as $s_0$ and $s_i$. The party that has $s_0$ (referred to as "client" in this example) may encrypt its data using a joint public key generated using an existing distributed key generation protocol for threshold FHE. The party that has $s_i$ (referred to as "server" in this example) may perform HE computations. In this example, the client and server $S_1$ of Example 1 correspond to the client here in this Example 2, and server $S_0$ of Example 1 corresponds to the server in this Example 2.

To perform interactive bootstrapping, the following protocol may be executed:
1) Server performs HE computations yielding a ciphertext $$(a, b) \in R_q^2;$$

2) Server computes $c_0=as_0+b$;
3) Server performs rounding: if $|c_0|>q/4$, then $c_0 \leftarrow c_0+(q/2)(\text{mod } q)$ (the operations are performed coordinate-wise, on each coefficient of $c_0$ independently);
4) Client computes $c_1=as_1$;
5) Client performs rounding: if $|c_1|>q/4$, then $c_1 \to c_1+(q/2)(\text{mod } q)$ (the operations are performed coordinate-wise, on each coefficient of $c_1$ independently);
6) Client encrypts $c_1$ as $Enc_P(c_1)$, and sends it to the server; and
7) Server computes $Enc_P(c_1)+c_0$ to obtain the desired ciphertext.

Example 3: Protocol Based on Threshold FHE with Rerandomization

This example is a modification of Example 2, where a ciphertext rerandomization may be added. One option is to do the rerandomization of the input ciphertext before starting the main bootstrapping protocol. The modified protocol may be executed as follows:
1) Server performs HE computations yielding a ciphertext $$(a', b') \in R_q^2;$$

then the server adds the public key encryption of 0: (a,b)= (a',b')+$Enc_P$(0); the server sends the ciphertext (a,b) to the client providing circuit privacy such that the client cannot learn (a',b');
2) Server computes $c_0=as_0+b$;
3) Server performs rounding: if $|c_0|>q/4$, then $c_0 \leftarrow c_0+(q/2)(\text{mod } q)$ (the operations are performed coordinate-wise, on each coefficient of $c_0$ independently);
4) Client computes $c_1=as_1$;
5) Client performs rounding: if $|c_1|>q/4$, then $c_1 \leftarrow c_1+(q/2)(\text{mod } q)$ (the operations are performed coordinate-wise, on each coefficient of $c_1$ independently;

6) Client encrypts $c_1$ as $Enc_P(c_1)$, and sends it to the server; and

7) Server computes $Enc_P(c_1)+c_0$ to obtain the desired ciphertext.

Another option is to rerandomize interactively using the secret shares of each party, similar to the protocol for generating the joint public key in threshold FHE.

Reference is made to FIG. 1, which schematically illustrates a multi-party system 200 for executing interactive homomorphic programs, according to some embodiments of the invention. Multi-party system 200 may be (or may include elements of) the system described in FIG. 2B. Multi-party system 200 may perform the operations described in reference to FIGS. 3 and 4.

Figure 2A:
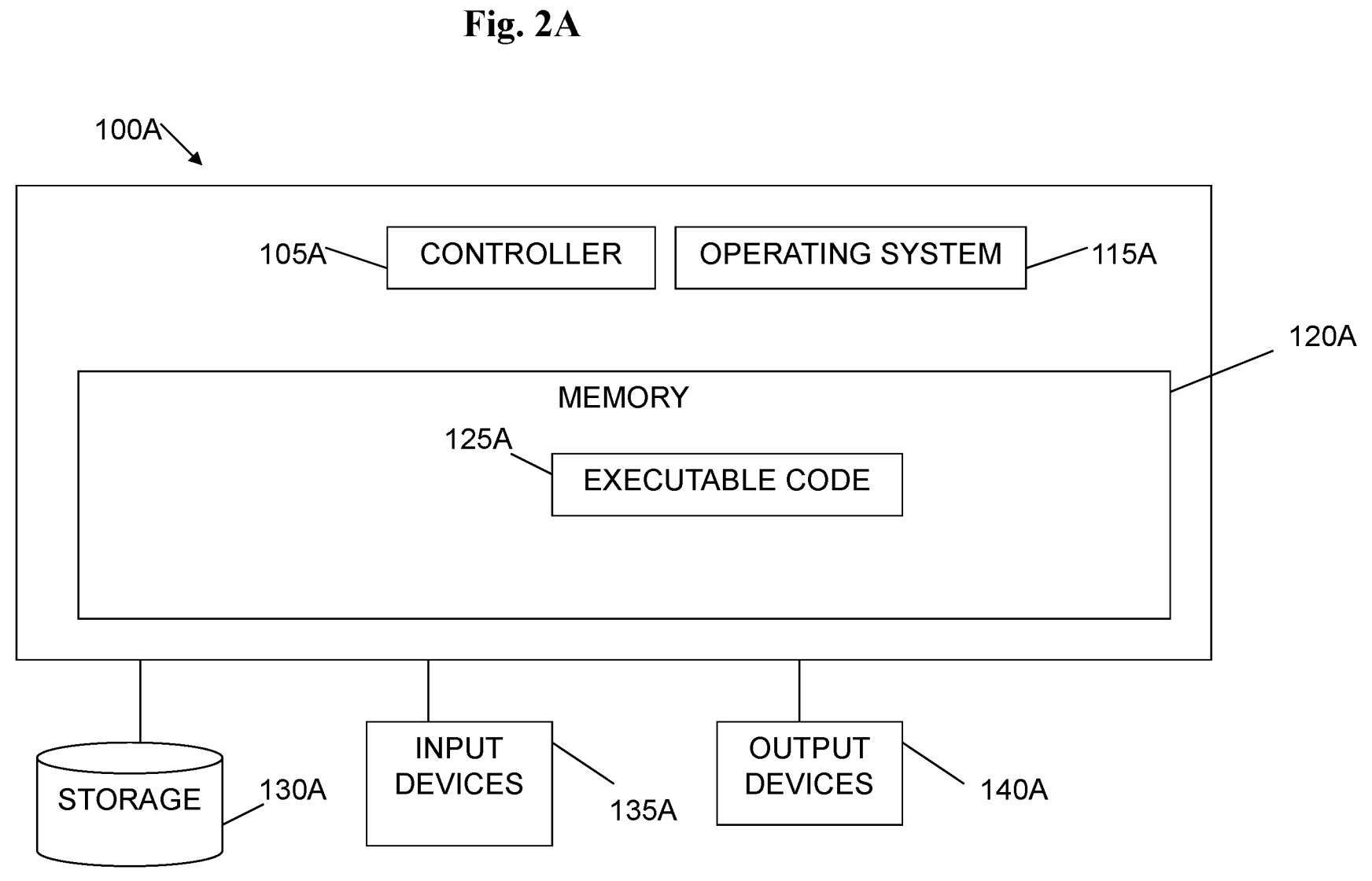
Figure 2B:
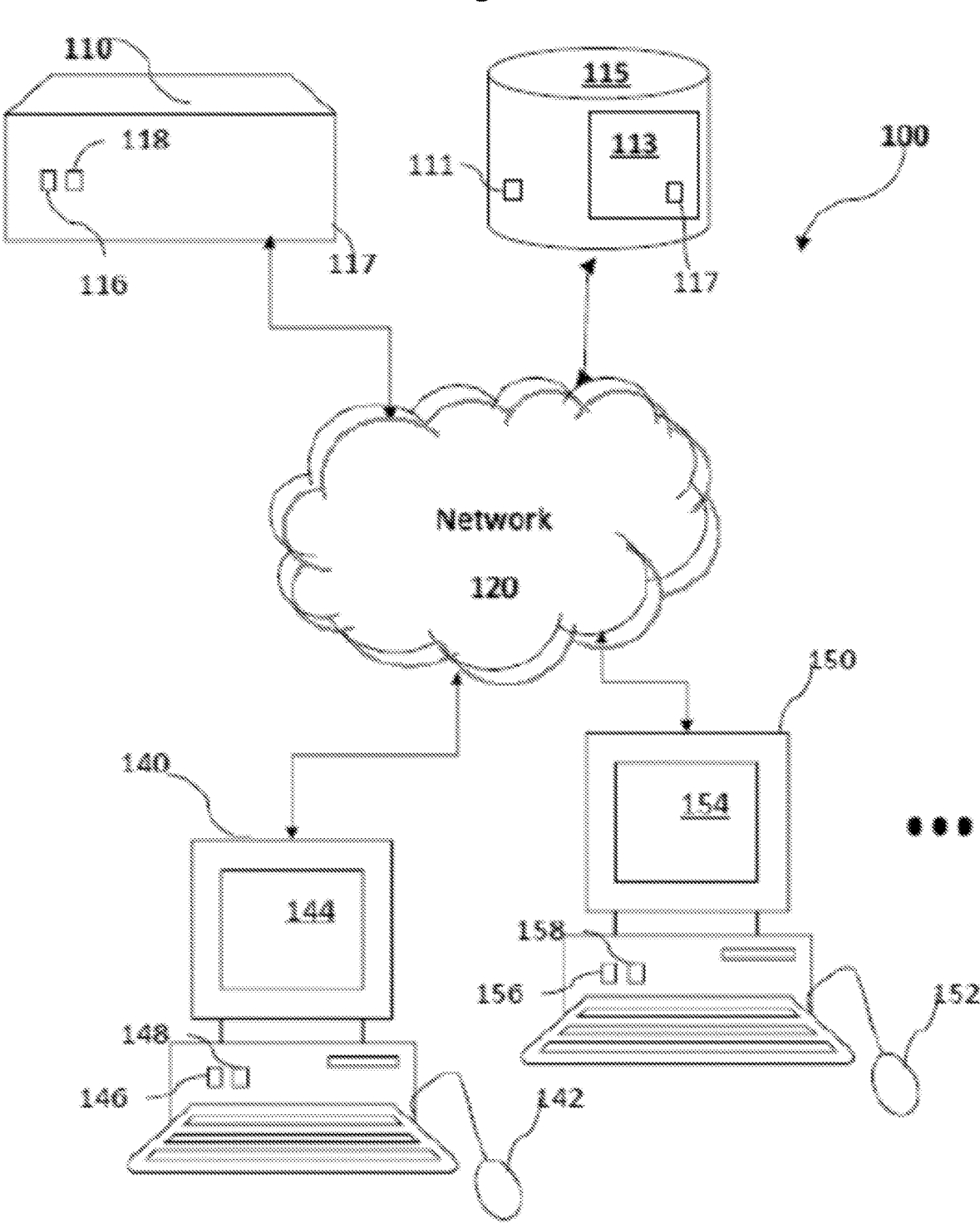
FIG. 2B is a schematic illustration of a multi-party system for executing interactive homomorphic programs, according to some embodiments of the invention.

Multi-party system 200 may include a server 210 and two or more interactive parties, each operating a distinct one of a plurality of n computer processors 250-1, 250-2, . . . , 250-n, where n is an integer, for example an integer greater than or equal to two. Each individual processor 250-i may be one or multiple processors or processor cores. Server 210 and party devices may each be a computing device 100A as described in FIG. 2A and/or FIG. 2B (e.g., server 210 may be host device 110, a garbler device may be party device 140 and an evaluator device may be party device 150, as shown in FIG. 2B).

For simplicity, each ith party is described to operate an ith processor 250-i, but in general, any combination of the plurality of n computer processors are part of, located on, and/or operably connected to server 210 or a party device. For example, server 210 may include m computer processors 250-1, . . . , 250-m, a first party device may include p computer processors 250-m+1, . . . , 250-m+p, a second party device may include q computer processors 250-m+p+1, . . . , 250-m+p+q, and so on (e.g., m, p, and q are any integers). For simplicity, the number of parties, processors and keys are numbered n, but their numbers may be different.

In some embodiments, server 210 is configured to split a shared secret key, $s=\Sigma_i s_i$ into two or more separate secret key shares, $s_i$, for the two or more respective parties and/or processors. The number of shares may be chosen based on the number of parties, the size of the ciphertext, the size of the decryption key, a number of available computer processors, a number of available computer processors trusted to perform operations with the shares securely, a desired processing time, a desired level of encryption noise, or any combination thereof. In some embodiments, the number of secret key shares may be determined by a number of parties, for example, how many banks are collaborating in situations where they are sharing data to build models of financial crime.

As shown in FIG. 1, server 210 may have stored and/or receive as input a decryption key 220 denoted s and split it into a first share 225-1 denoted $s_1$, a second share 225-2 denoted $s_2$, . . . and an nth share 225-n denoted $s_n$. The decryption key s can be a secret key. The decryption keys may be required as part of performing a decryption of a ciphertext with modulus q (e.g., the modulus of the FHE scheme). Server 210 may be configured to split the decryption key. In some embodiments, the decryption key s can be split such as shown in EQN. 5:

$$s = s_1 + s_2 + \ldots + s_n (\bmod q) \qquad \text{EQN. 5}$$

Server 210 may be configured to transmit to each of the plurality of n parties and/or n computer processors 250-1, 250-2, . . . , 250-n a ciphertext 230 denoted (a,b). In some embodiments, ciphertext 230 includes a pair of ring elements from a cyclotomic ring. In some embodiments, ciphertext 230 is encrypted using homomorphic encryption, for example, ciphertext 230 may be a BGV, BFV, or CKKS ciphertext encrypted using the BGV, BFV, or CKKS approximate homomorphic encryption scheme.

Server 210 may be configured to transmit to each of the plurality of n parties and/or n computer processors 250-1, 250-2, . . . , 250-n a unique share of the plurality of n shares of the decryption key. For example, server 210 may transmit share 225-1 of decryption key 220 to first party or computer processor 250-1, transmit share 225-2 of decryption key 220 to second party or computer processor 250-2 etc. and transmit share 225-n of decryption key 220 to nth party or computer processor 250-n. In some embodiments, the server transmits a unique share of the plurality of n shares of the decryption key to more than one party or computer processor. For example, server 210 may transmit the same share 225-1 to both computer processor 250-1 and computer processor 250-2 or first and second party. This may allow for a redundancy in embodiments of the invention and/or allow for comparison of received results among parties or computer processors receiving the same input information, for example in order to ensure the parties or processors are not deviating from the operations required by embodiments of the invention. In some embodiments, different parties or processors may not share unencrypted data, secret data or keys, e.g., for increased security in an untrusted or semi-trusted environment.

Server 210 may be configured to transmit an indication of a publicly available encryption key 240 denoted P to the n parties and/or n computer processors. The indication of the encryption key 240 may include the encryption key P itself, and/or an indication of where encryption key 240 may be accessed by the n parties and/or n computer processors, such as a file location and/or IP address. In some embodiments, an encryption key may have previously been distributed using any communication method known in the art, for example delivery by post of a USB drive containing the encryption key, which may then be inserted into a computing device containing one or more computer processors so that the encryption key is accessible by the one or more computer processors for use in accordance with embodiments of the invention. In some embodiments, encryption key 240 (e.g., P) corresponds to s the decryption key 220. For example, s and P may be respective decryption and encryption keys for the same encryption, with s used in undoing (e.g., decrypting) the encryption of P. In other embodiments, encryption key 240 (e.g., P) does not correspond to s the decryption key 220.

Server 210 may be configured to transmit to each of (i) the ciphertext 230; (ii) a unique share $s_i$ 225-i of the plurality of n shares of the shared secret (decryption) key $s=\Sigma_i s_i$ 220; and/or (iii) the indication of a publicly available encryption key 240, to each of the plurality of n parties and/or n computer processors substantially, in parallel, for example, approximately simultaneously, concurrently, or within a bounded time period of one another such as 5 seconds or less. Each of the plurality of n parties and/or n computer processors 250-1, 250-2, . . . , 250-n, may receive and store in one or more associated memories the data transmitted thereto.

In some embodiments, each of the plurality of n parties and/or n computer processors 250-1, 250-2, . . . , 250-n, are configured to partially decrypt ciphertext 230 using the party's unique secret key share 225-1, 225-2, . . . , 225-n to generate the party's unique data share, share$_i$, 260-1, 260-2, . . . , 260-n. For example: first party or computer processor 250-1 may calculate a partial decryption 260-1 of ciphertext 230 using share 225-1 of decryption key 220 (for example evaluating $c_1=Dec_{s_1}(a,b)$); computer processor 250-2 may calculate a decryption 260-2 of ciphertext 230 using share 225-2 of decryption key 220 (for example evaluating $c_2=Dec_{s_2}(a,b)$), etc.; and computer processor 250-n may calculate a decryption 260-n of ciphertext 230 using share 225-n of decryption key 220 (for example evaluating $c_n=Dec_{s_n}(a,b)$). In various embodiments, all, some or any combination of the plurality of n parties and/or n computer processors may process received data independently of one another, without interaction or communication with other processors of the plurality of n computer processors.

In some embodiments, each of the plurality of n parties and/or n computer processors 250-1, 250-2, . . . , 250-n, are configured to linearizing the unique data share (e.g., from a non-linear data share) to enable the party's unique data share to be combined with other parties' unique data shares at compact size. Linearization may include rounding the decryption of the ciphertext if an absolute value of the decryption of the ciphertext is greater than a predefined value. For example, computer processor 250-1 may check if an absolute value of decryption value 260-1 is greater than a predefined value, for example if $|c_1|>q/4$. If so, first party and/or computer processor 250-1 may round decryption value 260-1 by performing an operation as shown below in EQN. 6:

$$c_1 \leftarrow c_1 + (q/2)(\bmod q) \qquad \text{EQN. 6}$$

The operation may be performed coordinate-wise (e.g., in parallel using a SIMD program), on each coefficient of $c_1$ independently. Similarly, second party and/or computer processor 250-2 may check if $|c_2|>q/4$ and, if so, may perform an operation as shown below in EQN. 7:

$$c_2 \leftarrow c_2 + (q/2)(\bmod q) \qquad \text{EQN. 7}$$

Such checks and rounding may be performed for each party and/or computer processor such that computer processor 250-n may check if $|c_n|>q/4$ and, if so, may perform an operation as shown below in EQN. 8:

$$c_n \leftarrow c_n + (q/2)(\bmod q) \qquad \text{EQN. 8}$$

In some embodiments, each of the plurality of n parties and/or n computer processors are configured to take a reduced modulus of its linear (rounded) share $c_i$. In some embodiments, taking a reduced modulus may reduce the size of the data shares to a compact size to increase processing efficiency. In some embodiments, taking a reduced modulus may eliminate noise in the linear share to generate a noiseless unencrypted share $c_i$ of compact size. The modulus of the linear shares may be reduced (e.g., from modulo q to modulo p, where p is the plaintext modulus of each of the one or more unencrypted values and q is the modulus of the FHE scheme, q>>p). The modulus may be the same or different for each of the plurality of n computer processor, for example first computer processor 250-1 may use a modulus $q_1$, second computer processor 250-2 may use a modulus $q_2$, etc. and nth computer processor 250-n may use a modulus $q_n$. The moduli $q_1, q_2, \ldots, q_n$ may be used by computer processors 250-1, 250-2, . . . , 250-n during a check of the decrypted values 260-1, 260-2, . . . , 260-n and any required rounding operations as a result of the check (e.g., described in EQNs. 6-8).

After each of the plurality of n parties and/or n computer processors generates a linear unique garbled data share at reduced size, they are prepared to collaborate efficiently under interactive multi-party FHE schemes according to various embodiments (e.g., described in reference to FIGS. 3 and/or 4), for example as follows.

According to some embodiments of the invention (e.g., described in reference to FIG. 3), system 200 performs interactive multi-party homomorphic SIMD operations using garbled circuits, which provides fast and efficient SIMD parallelization over non-linear operations (such as, comparisons) enabled by garbled circuits. Multi-party system 200 may include at least two parties—a garbler (e.g., operating computer processor 250-1) and an evaluator (e.g., operating computer processor 250-2). Any number of additional parties and processors may be linked in a sequence of more than two parties (e.g., operating computer processor 250-3, . . . , 250-n), where the operations described for the first garbler-evaluator pair are iteratively executed between each linked pair of parties in the sequence. For example, in each iterative garbler-evaluator pair-wise execution (e.g., operating computer processors 250-i and 250-i+1), the evaluator (e.g., operating computer processor 250-i+1) from a previous iteration is reset to be the garbler device in a current iteration and a third party of the more than two parties (e.g., operating computer processor 250-i+2) is set to be the evaluator device in the current iteration.

In some embodiments, the garbler party or processor 250-1 may generate, and send to the evaluator party or processor 250-2, a garbled circuit defining an operation (e.g., a non-linear operation such as a comparison) on one or more values (e.g., to each other or to a fixed value) encrypted in the ciphertext 230, a garbling of the garbler's linear unique data share, and garbled potential wires by which the evaluator party or processor 250-2 garbles its own linear unique data share by oblivious transfer. The evaluator party or processor 250-2 may evaluate the garbled circuit to execute a SIMD program to combine, in parallel, multiple indices of the linear garbler and evaluator unique data shares to generate an encrypted result of the garbled circuit operation on the one or more encrypted values (e.g., according to EQN. 1). The evaluator party or processor 250-2 may transmit the encrypted result to the server 210 or another third party that stores the shared secret key $s=\Sigma_i s_i$ to decrypt the result (though decryption is not required).

According to some embodiments of the invention (e.g., described in reference to FIG. 4), system 200 performs interactive multi-party bootstrapping in a FHE protocol.

In some embodiments, each of the plurality of n parties and/or n computer processors 250-1, 250-2, . . . , 250-n, are configured to re-encrypt the noiseless share $c_i$ using the shared public key P to add noise $Enc_P(c_i)$. For example: first party or computer processor 250-1 may re-encrypt decryption 260-1 using publicly available encryption key 240 to arrive at encrypted value 270-1 (for example evaluating $Enc_P(c_1)$); second party or computer processor 250-2 may re-encrypt decryption 260-2 using publicly available encryption key 240 to arrive at encrypted value 270-2 (for example evaluating $Enc_P(c_2)$), etc.; and nth party or computer processor 250-n may re-encrypt decryption 260-n using publicly available encryption key 240 to arrive at encrypted value 270-*n* (for example evaluating $Enc_P(c_n)$).

In some embodiments, each of the plurality of n parties and/or n computer processors 250-1, 250-2, ..., 250-*n*, are configured to transmit its re-encrypted share to the server 210 or another third party. In some embodiments, each of all but one of the plurality of n parties and/or n computer processors 250-1, 250-2, ..., 250-*n*, are configured to transmit its re-encrypted share to one party and/or computer processor 250-*i*.

Server 210, third party or party and/or computer processor 250-*i* may be configured to receive, from each of the plurality of n parties and/or n computer processors 250-1, 250-2, ..., 250-*n*, n encrypted values 270-1, 270-2, ..., 270-*n* denoted $Enc_P(c_1)$, $Enc_P(c_2)$, ..., $Enc_P(c_n)$. The encrypted values may be received substantially in parallel, for example, approximately simultaneously, concurrently, or within a bounded time period of one another such as 5 seconds or less.

Server 210, third party or party and/or computer processor 250-*i* may be configured to bootstrap by linearly combining the re-encrypted shares of the n parties and/or n computer processors 250-1, 250-2, ..., 250-*n* to generate an updated ciphertext c' of the encoded message. Server 210, third party or party and/or computer processor 250-*i* may compute a homomorphic sum 280 $c'=\Sigma_i Enc_P(c_i)$ of the n encrypted values 270-1, 270-2, ..., 270-*n* to obtain an encryption of the sum of n decrypted values 260-1, 260-2, ..., 260-*n* such that a bootstrapping of the encryption is distributed (e.g., among the plurality of n computer processors). Computing the homomorphic sum may be performed as shown below in EQN. 9:

$$Enc_P(c_1) + Enc_P(c_2) + ... + Enc_P(c_n) = Enc_P(c_1 + c_2 + ... + c_n) \quad \text{EQN. 9}$$

In some embodiments, each of the n encryption values 270-1, 270-2, ..., 270-*n* are independent of decryption key 220. For example, P the publicly available encryption key 240 may correspond to a different secret key than s the decryption key 220. This may allow system 200 to perform key switching.

FIG. 2A shows a block diagram of an exemplary computing device which may be used with embodiments of the present invention. Computing device 100A may include a controller or computer processor 105A that may be, for example, a central processing unit processor (CPU), a chip or any suitable computing device, an operating system 115A, a memory 120A, a storage 130A, input devices 135A and output devices 140A such as a computer display or monitor displaying for example a computer desktop system. Server 210 and/or party devices of FIG. 1 may be (or may include), for example, a computing device 100A.

Operating system 115A may be or may include code to perform tasks involving coordination, scheduling, arbitration, or managing operation of computing device 100A, for example, scheduling execution of programs. Memory 120A may be or may include, for example, a random access memory (RAM), a read only memory (ROM), a Flash memory, a volatile or non-volatile memory, or other suitable memory units or storage units. At least a portion of Memory 120A may include data storage housed online on the cloud. Memory 120A may be or may include a plurality of different memory units. Memory 120A may store for example, instructions (e.g., code 125A) to carry out a method as disclosed herein. Memory 120A may use a datastore, such as a database.

Executable code 125A may be any application, program, process, task, or script. Executable code 125A may be executed by controller 105A possibly under control of operating system 115A. For example, executable code 125A may be, or may execute, one or more applications performing methods as disclosed herein, such as splitting a decryption key into a plurality of n shares. In some embodiments, more than one computing device 100A or components of device 100A may be used. One or more processor(s) 105A may be configured to carry out embodiments of the present invention by for example executing software or code.

Storage 130A may be or may include, for example, a hard disk drive, a floppy disk drive, a compact disk (CD) drive, a universal serial bus (USB) device or other suitable removable and/or fixed storage unit. Data described herein may be stored in a storage 130A and may be loaded from storage 130A into a memory 120A where it may be processed by controller 105A. Storage 130A may include cloud storage. Storage 130A may include storing data in a database.

Input devices 135A may be or may include a mouse, a keyboard, a touch screen or pad or any suitable input device or combination of devices. Output devices 140A may include one or more displays, speakers and/or any other suitable output devices or combination of output devices. Any applicable input/output (I/O) devices may be connected to computing device 100A, for example, a wired or wireless network interface card (NIC), a modem, printer, a universal serial bus (USB) device or external hard drive may be included in input devices 135A and/or output devices 140A.

Embodiments of the invention may include one or more article(s) (e.g., memory 120A or storage 130A) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

FIG. 2B is a schematic drawing of a system 100 according to some embodiments of the invention. System 200 of FIG. 1 may be, or may include elements of, a system such as system 100. Embodiments of the invention described herein, such as computer implemented methods, may be executed using any single or combination of devices and/or components of system 100 of FIG. 2B. The devices of system 100 may be operated by parties including one or more party device(s) 140, 150, ..., one or more host device(s) 110, and one or more database(s) 115. Each party's device(s) 110, 115, 140, and 150, may include one or more server(s), storage device(s), computer(s) such as, personal computers, desktop computers, mobile computers or devices, laptop computers, and notebook computers or any other suitable device such as a cellular telephone, personal digital assistant (PDA), video game console, etc., and may include wired or wireless connections or modems.

In one implementation, host device(s) 110 may include one or more servers, database(s) 115 may include one or more storage devices comprising memory/memories 113, and party device(s) 140 and 150 may include one or more computers or mobile devices, such as, smart tablets or cellular telephones. Party device(s) 140 and 150 may include respective memories 148 and 158 for storing data owner information. Party device(s) 140 and 150 may include one or more input devices 142 and 152, respectively, for receiving input from a user, such as, two encrypted numbers.

Party device(s) 140 and 150 may include one or more output devices 144 and 154 (e.g., a monitor or screen) for displaying data to the data owner provided by or for host device(s) 110. Server 210 of FIG. 1 may be (or may be part of), for example, a host device 110, and each of the plurality of n computer processors 250-1, 250-2, . . . , 250-$n$ of FIG. 1 may be, or may be part of, party devices 140, 150, etc.

Database(s) 115 may be a storage device comprising one or more memories 113 to store encrypted data 117, such as, two encrypted numbers. In alternate embodiments, database(s) 115 may be omitted and encrypted data 117 may be stored in an alternate location, e.g., exclusively in memory unit(s) 148 and 158 of the respective entity devices, or in host device memory 118.

Any or all of system 100 devices may be connected via one or more network(s) 120. Network 120 may be any public or private network such as the Internet. Access to network 120 may be through wire line, terrestrial wireless, satellite, or other systems well known in the art.

Each system device 110, 115, 140, and 150 may include one or more controller(s) or processor(s) 116, 111, 146, and 156, respectively, for executing operations according to embodiments of the invention and one or more memory unit(s) 118, 113, 148, and 158, respectively, for storing data (e.g., client information, server shares, private keys, public keys, etc.) and/or instructions (e.g., software for applying computations or calculations to encrypt data, to decrypt data, and other operations according to embodiments of the invention) executable by the processor(s).

Processor(s) 116, 111, 146, and/or 156 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 113, 148, and/or 158 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Figure 3:
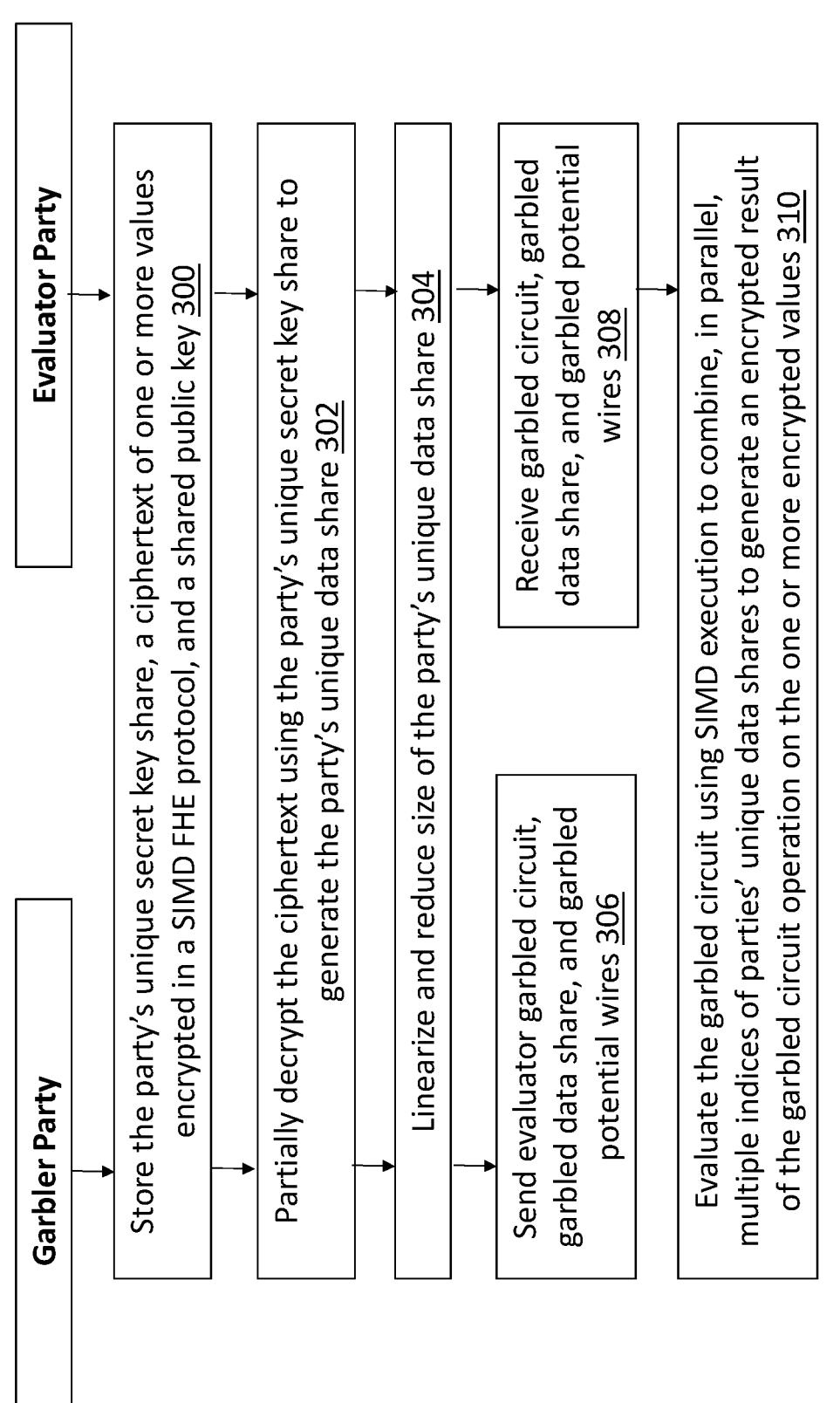
FIG. 3 is a flowchart of a method for multi-party interactive execution of homomorphic SIMD operations using garbled circuits, according to some embodiments of the invention.

Reference is made to FIG. 3, which is a flowchart of a computer implemented method for multi-party interactive execution of homomorphic SIMD operations using garbled circuits, according to an embodiment of the invention. This method may be implemented by one or more elements of systems or devices 200, 100A, and/or 100 as shown in FIGS. 1, 2A, and 2B, respectively.

In operation 300, each of the garbler and evaluator (first party or processor 250-1 and second party or processor 250-2), independently without communication therebetween, may receive from server 210 and store the party's unique secret key share $s_i$ of a shared secret key $s=\Sigma_i s_i$, a ciphertext of one or more values encrypted in a SIMD FHE protocol, and a shared public key encrypting the ciphertext.

In operation 302, each of the garbler and evaluator, independently without communication therebetween, may partially decrypt the ciphertext using the respective party's unique secret key share $s_i$ to generate the party's unique data share, share$_i$.

In operation 304, each of the garbler and evaluator, independently without communication therebetween, may linearize (e.g., by distributed rounding) the party's respective unique data share (e.g., from a non-linear data share) and reduce size of the party's unique data share (e.g., by modulo p), for example, to enable both data shares to be combined at compact size. In some embodiments, maximal share size reduction (e.g., modulo p, where p is the plaintext modulus of each of the one or more unencrypted values) may eliminate noise in the linear share to generate a noise-less (unencrypted) share. The garbler may thus generate and share a mask with the evaluator to combine both parties' shares under the mask.

In operation 306 the garbler may send, and in operation 308 the evaluator may receive, a garbled circuit defining an operation on the one or more values (e.g., a non-linear comparison of the one or more values to a fixed value), a garbling of the garbler's linear unique data share, a garbled mask, and garbled potential wires. The evaluator may garble its linear unique evaluator data share by the garbled potential wires of the garbled circuit using oblivious transfer.

In operation 310, the evaluator may evaluate the garbled circuit using a SIMD execution to combine, in parallel, multiple indices of the linear garbler and evaluator unique data shares to generate an encrypted result of the garbled circuit operation on the one or more encrypted values. In some embodiments, the garbled circuit may combine the two parties' unique data shares under the mask and the evaluator may unmask the output to generate the encrypted result of operation 310.

After operation 310, the evaluator may transmit the encrypted result to server 210 or another third party that stores the shared secret key to decrypt the result (though decryption is not required).

In a system with more than two parties interacting to execute the homomorphic SIMD operations, operations of FIG. 3 are iteratively executed pair-wise between pairs of garbler-evaluator parties in a linked sequence, wherein in each iterative pair-wise execution, the evaluator from a previous iteration is reset to be the garbler in a current iteration and a next sequential party of the more than two parties is set to be the evaluator in the current iteration. In one implementation, the reset garbler (having previously executed operations 300-304 may not repeat these operations and start the garbler process at operation 306), while the new evaluator (having executed no operations previously) may iterate over all operations 300-310. Each evaluator's encrypted result in operation 310 may be transmitted, for example, to the next iteration's evaluator or to a centralized party (e.g., server 210 or another third party) to combine all evaluators' encrypted result to generate a complete encrypted result accumulating the contributions of all of the more than two parties. In some embodiments, each iterative pair-wise execution operates under a different shared secret key $s=\Sigma_i s_i$ combining the unique garbler secret key share and the evaluator secret key share in a current iteration. Encryption keys may be changed in each iteration by key switching. The garbler in the previous and current iterative pair-wise executions may send different or the same garbled circuits to the evaluator.

Other operations or orders of operations may be used and operations may be omitted.

Reference is made to FIG. 4, which is a flowchart of a computer implemented method 400 for interactive multi-party bootstrapping in a FHE protocol, according to an embodiment of the invention. This method may be implemented by one or more elements of systems or devices 200, 100A, and/or 100 as shown in FIGS. 1, 2A, and 2B, respectively.

A server may split a decryption key into a plurality of n secret key shares (e.g., 225-1, 225-2, . . . , 225-$n$ described in FIG. 1), where n is an integer. The server may be a server such as server 210 described in FIG. 1. In some embodiments, n is greater than or equal to two. The decryption key may be a decryption key 220 described in FIG. 1. The server may transmit to each of n parties or processors (e.g., 250-1, . . . , 250-$n$) (i) an initial ciphertext c of an encoded message, wherein the ciphertext is encrypted using homomorphic encryption; (ii) a unique share of the plurality of n shares of the decryption key; and (iii) an indication of a publicly available encryption key (e.g., 240 of FIG. 1). The server may rerandomize the initial ciphertext to increase security so the initial ciphertext cannot be determined by the parties. The server may transmit data to each of the plurality of n computer processors substantially in parallel, for example, approximately simultaneously, concurrently, or within a bounded time period of one another such as 5 seconds.

The plurality of parties may operate respective processors 250-1, . . . , 250-$n$ of FIG. 1. In some embodiments, each of the plurality of n computer processors are located on the server. In some embodiments, each of the plurality of n computer processors are located on a same second server. In some embodiments, each of the plurality of n computer processors are located on a corresponding plurality of n different servers. In some embodiments, each of the plurality of n computer processors are located on a plurality of m different servers in any combination, where m is an integer. The plurality of n and/or m different servers may be semi-honest servers.

The ciphertext may be a ciphertext such as ciphertext 230 described in FIG. 1. In some embodiments, the ciphertext is encrypted using the BGV, BFV or CKKS approximate homomorphic encryption scheme. In some embodiments, the ciphertext comprises a pair of ring elements from a cyclotomic ring.

In operation 400, each of a plurality of parties (e.g., operating respective processors 250-1, . . . , 250-$n$), independently without communication therebetween, may receive from the server and store in its memory: (i) the initial ciphertext c of the encoded message, (ii) the party's unique secret key share $s_i$ of a shared secret key $s = \Sigma_i s_i$, and (iii) an indication of a publicly available encryption key encrypting the initial ciphertext.

In operation 402, each party, independently without communication therebetween, may partially decrypt the initial ciphertext using the respective party's unique secret key share $s_i$ to generate the party's unique data share, share$_i$.

In operation 404, each party, independently without communication therebetween, may linearize (e.g., by distributed rounding) the party's respective unique data share (e.g., from a non-linear data share).

In operation 406, each party, independently without communication therebetween, may eliminate noise in the linear share to generate a noiseless unencrypted share $c_i$ of compact size (e.g., reducing the size of the party's unique data share by maximum modulo p, where p is the plaintext modulus of unencrypted encoded message), for example, to enable both data shares to be combined at compact size.

In operation 408, each party, independently without communication therebetween, may re-encrypt the noiseless share $c_i$ using the shared public key to add noise $Enc_P(c_i)$.

In operation 410, each party, independently without communication therebetween, may send the re-encrypted share to a different party (e.g., server 210, a third party or another interactive party or processors 250-$i$), or receive re-encrypted shares from others of the two or more parties, to bootstrap by linearly combining the re-encrypted shares of the two or more parties that generates an updated ciphertext $c' = \Sigma_i Enc_P(c_i)$ of the encoded message. The party that receives all parties' re-encrypted shares and generates the updated ciphertext may or may not possess the shared secret key to decrypt the updated ciphertext.

Each of the n re-encrypted shares may be re-encryptions of a decryption of the ciphertext, the re-encryption performed by each of the plurality of n computer processors using the publicly available encryption key, and the decryption of the ciphertext performed by each of the plurality of n computer processors using the unique share of the plurality of n shares of the decryption key transmitted to each of the plurality of n computer processors. The encrypted values may be encrypted values such as encrypted values 270-1, 270-2, . . . , 270-$n$ shown in FIG. 1, and the decrypted values may be decrypted values such as decrypted values 260-1, 260-2, . . . , 260-$n$ shown in FIG. 1. The party may receive all parties' re-encrypted shares substantially in parallel, for example, approximately simultaneously, concurrently, or within a bounded time period of one another such as 5 seconds or less.

The party may receive all parties' re-encrypted shares may linearly combine the re-encrypted shares as a homomorphic sum of the n encrypted values to obtain an encryption of the sum of n decrypted values, such that a bootstrapping of the encryption is distributed. The homomorphic sum may be a homomorphic sum such as homomorphic sum 280 shown in FIG. 1 and expressed in EQN. 9.

Each party may perform operations 402-408 using a SIMD program, such that, in each operation, a single instruction may execute, in parallel, on multiple indices of the data (e.g., data shares, linear shares, noiseless shares, re-encrypted shares, linearly combined shares, initial ciphertexts, and/or updated ciphertexts).

Bootstrapping may be used to turn approximate homomorphic encryption schemes into fully homomorphic encryption schemes, reduce the noise of the encryption, increase the plaintext modulus of a ciphertext, switch between different encryption keys, switch between different FHE schemes. In one embodiment, the initial FHE ciphertext may be an exhausted FHE ciphertext of the encoded message with insufficient computational depth to perform FHE operations thereon, the added noise enhances computational depth, and the updated FHE ciphertext is a refreshed FHE ciphertext of the encoded message with sufficient computational depth to perform FHE operations thereon.

The shared secret key may correspond to the shared public key (decrypting a ciphertext encrypted by the public key) or the shared secret key may correspond to a different public key than the shared public key (decrypting a ciphertext encrypted by a different public key, not decrypting a ciphertext encrypted by the shared public key).

In some embodiments, the initial ciphertext may be decrypted by each of the plurality of n computer processors using the unique share of the plurality of n shares of the decryption key transmitted to the plurality of n parties or computer processors, and a modulus. The modulus may be different for each of the plurality of n computer processors, for example a first modulus $q_1$, a second modulus $q_2$, etc. and an nth modulus $q_n$.

In some embodiments, each of the n encryption values may be independent of the decryption key. For example, the publicly available encryption key may correspond to a different secret key than the decryption key, which may allow the bootstrapping in FIG. 4 to perform key switching.

In some embodiments, rounding of the decryption of the ciphertext is executed if an absolute value of the decryption of the ciphertext is greater than a predefined value. The rounding may be as described above with reference to EQNs. 2 and/or 6-8.

In some embodiments, the server may transmit, to each of the plurality of n parties or computer processors, a hash function. The decryption of the ciphertext (e.g., by the plurality of n computer processors) may include using the hash function. The hash function may be a hash function $$H:R_q^2 \rightarrow R_q$$

(e.g., modelled as a random oracle). In some embodiments, the server may send a different hash function to each of the plurality of n computer processors, e.g., n hash functions $H_1$, $H_2$, ..., H.

Other operations or orders of operations may be used and operations may be omitted.

According to one or more embodiments of the invention, there is provided a computer program product containing instructions which, when executed by at least one processor (such as a processor in a server) cause the at least one processor to carry out methods described herein (e.g., in reference to FIGS. 3 and/or 4).

Non-linear operations may include power or exponential operations or one or more comparison operations such as inequalities (e.g., $m > \alpha$ and/or $m < \alpha$ or equivalently $\alpha > m$) and/or equalities (e.g., $m = \alpha$ and/or $m \neq \alpha$). In some embodiments, equalities may be determined by running two comparisons on inequalities (e.g., if both $m > \alpha$ and $m < \alpha$, then $m = \alpha$). A comparison $m > \alpha$ is equivalent to the sign of the difference $m - \alpha$. A program may include one or more operations. A SIMD program may include one or more iterations of a single operation executed, in parallel or simultaneously, over multiple data points to generate multiple respective independent operation results.

According to one or more embodiments of the invention, there is provided:

1. A computer implemented method for interactive multiparty bootstrapping in a fully homomorphic encryption (FHE) protocol, the method comprising:
   at one party of two or more parties:
      storing a unique secret key share of a shared secret key, an initial FHE ciphertext c of an encoded message, and a shared public key encrypting the ciphertext;
      partially decrypting the initial ciphertext using the unique secret key share $s_i$ to generate a unique data share;
      linearizing the unique data share to enable shares to be combined at compact size;
      eliminating noise in the linear share to generate a noiseless unencrypted share of compact size;
      re-encrypting the noiseless share using the shared public key to add noise; and
      sending the re-encrypted share to a different party, or receiving re-encrypted shares from others of the two or more parties, to bootstrap by linearly combining the re-encrypted shares of the two or more parties that generates an updated ciphertext of the encoded message.

2. The method of 1, wherein the party linearizes the unique data share by distributed rounding.

3. The method of 1, wherein the party eliminates noise in the linear unique data share by reducing the linear unique data share by modulo p, where p is the plaintext modulus of unencrypted encoded message.

4. The method of 1, wherein the party uses a Single-Instruction/Multiple-Data (SIMD) program to execute a single instruction, in parallel, on multiple indices of data.

5. The method of 1, wherein the initial ciphertext is rerandomized.

6. The method of 1, wherein the initial FHE ciphertext is an exhausted FHE ciphertext of the encoded message with insufficient computational depth to perform FHE operations thereon and the updated FHE ciphertext is a refreshed FHE ciphertext of the encoded message with sufficient computational depth to perform FHE operations thereon.

7. The method of 1, wherein the initial FHE ciphertext is encrypted under a different key or protocol than the updated ciphertext to allow key or protocol switching.

8. A party in a multi-party system for interactive bootstrapping in a fully homomorphic encryption (FHE) protocol, the party comprising:
   one or more memories configured to store a unique secret key share of a shared secret key, an initial FHE ciphertext c of an encoded message, and a shared public key encrypting the initial ciphertext; and
   one or more processors configured to:
      partially decrypt the initial ciphertext using the unique secret key share $s_i$ to generate a unique data share,
      linearize the unique data share to enable shares to be combined at compact size,
      eliminate noise in the linear share to generate a noiseless unencrypted share of compact size,
      re-encrypt the noiseless share using the shared public key to add noise, and
      send the re-encrypted share to a different party, or receive re-encrypted shares from others of the two or more parties, to bootstrap by linearly combining the re-encrypted shares of the two or more parties that generates an updated ciphertext of the encoded message.

9. The party of 8, wherein the one or more processors are configured to linearize the unique data share by distributed rounding.

10. The party of 8, wherein the one or more processors are configured to eliminate noise in the linear unique data share by reducing the linear unique data share by modulo p, where p is the plaintext modulus of unencrypted encoded message.

11. The party of 8, wherein the one or more processors are configured to use a Single-Instruction/Multiple-Data (SIMD) program to execute a single instruction, in parallel, on multiple indices of data.

12. The party of 8, wherein the initial ciphertext is rerandomized.

13. The party of 8, wherein the one or more processors are configured to, wherein the initial FHE ciphertext is an exhausted FHE ciphertext of the encoded message with insufficient computational depth to perform FHE operations thereon and the updated FHE ciphertext is a refreshed FHE ciphertext of the encoded message with sufficient computational depth to perform FHE operations thereon.

14. The party of 8, wherein the initial FHE ciphertext is encrypted under a different key or protocol than the updated ciphertext to allow key or protocol switching.

Unless specifically stated otherwise, as apparent from the foregoing discussion, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may include an article such as a computer or processor readable non-transitory storage medium, such as for example a memory, a disk drive, or a USB flash memory encoding, including, or storing instructions, e.g., computer-executable instructions, which when executed by a processor or controller, cause the processor or controller to carry out methods disclosed herein.

It should be recognized that embodiments of the invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures, and examples.

It is to be understood that the details set forth herein do not construe a limitation to an application of the invention.

Furthermore, it is to be understood that the invention may be carried out or practiced in various ways and that the invention may be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps, or integers.

If the specification or claims refer to "an additional" element, that does not preclude there being more than one of the additional elements.

It is to be understood that where the claims or specification refer to "a" or "an" element, such reference is not to be construed that there is only one of that element.

It is to be understood that where the specification states that a component, feature, structure, or characteristic "may", "might", "may" or "could" be included, that a particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A computer implemented method for executing an interactive multi-party Single-Instruction/Multiple-Data (SIMD) program using a garbled circuit under a fully homomorphic encryption (FHE) protocol, the method comprising:

storing, in a garbler device, in communication with an evaluator device, in a system of two or more parties, a unique garbler secret key share of a shared secret key, a ciphertext of one or more values encrypted in a SIMD FHE protocol, and a shared public key encrypting the ciphertext;

partially decrypting, in the garbler device, the ciphertext using the unique garbler secret key share to generate a unique garbler data share that is non-linear;

linearizing, in the garbler device, the unique garbler data share that is non-linear to generate a linear unique garbler data share configured to be combined with other parties' shares at compact size; and sending, from the garbler device to the evaluator device, a garbled circuit configured to perform an operation on the one or more values, a garbling of the linear unique garbled data share, and garbled potential wires into which the evaluator device is adapted to garble a linear unique evaluator data share by oblivious transfer, wherein the garbled circuit is adapted to be evaluated by the evaluator device using a SIMD execution that combines, in parallel, multiple indices of the garbling of the linear unique garbled data share and an evaluator unique data share to generate an encrypted result of the operation of the garbled circuit on the one or more encrypted values.

2. The method of claim 1, wherein the operation is iteratively executed pair-wise between pairs of parties in a linked sequence of more than two parties, wherein in each iterative pair-wise execution, the evaluator device from a previous iteration is reset to be the garbler device in a current iteration and a third party of the more than two parties is set to be the evaluator device in the current iteration.

3. The method of claim 2, wherein each iterative pair-wise execution operates under a different shared secret key combining the unique the garbler secret key share of the garbler device and the evaluator secret key share of the evaluator device in a current iteration.

4. The method of claim 2, wherein the garbler device in the previous and current iterative pair-wise executions send different or the same garbled circuits to the evaluator device.

5. The method of claim 1, wherein the garbler device linearizes the unique garbler data share by distributed rounding.

6. The method of claim 1 comprising, at the garbler device, reducing a size of the linear share to the compact size by modulo p, where p is the plaintext modulus of each of the one or more unencrypted values.

7. The method of claim 1, wherein the garbler device sends the garbled circuit that combines the two parties' unique data shares under a mask.

8. A garbler device, in communication with an evaluator device, in a system of two or more parties, the garbler device comprising:

one or more memories configured to store a unique garbler secret key share of a shared secret key, a ciphertext of one or more values encrypted in a SIMD FHE protocol, and a shared public key encrypting the ciphertext; and one or more processors configured to:

partially decrypt the ciphertext using the unique garbler secret key share $s_i$ to generate a unique garbler data share, linearize the unique garbler data share that is non-linear to generate a linear unique garbler data share to be combined with other parties' shares at compact size, and generate, and send to the evaluator device, a garbled circuit configured to perform an operation on the one or more values, a garbling of the linear unique garbled data share, and garbled potential wires into which the evaluator device is adapted to garble a linear unique evaluator data share by oblivious transfer, wherein the garbled circuit is adapted to be evaluated by the evaluator device using a SIMD execution that combines, in parallel, multiple indices of the garbling of the linear unique garbled data share and an evaluator unique data share to generate an encrypted result of the operation of the garbled circuit on the one or more encrypted values.

9. The garbler device of claim 8, wherein the operation is iteratively executed pair-wise between pairs of parties in a linked sequence of more than two parties, wherein in each iterative pair-wise execution, the evaluator device from a previous iteration is reset to be the garbler device in a current iteration and a third party of the more than two parties is set to be the evaluator device in the current iteration.

10. The garbler device of claim 8, wherein the one or more processors are configured to linearize the unique garbler data share by distributed rounding.

11. The garbler device of claim 8, wherein the one or more processors are configured to reduce a size of the linear share to the compact size by modulo p, where p is the plaintext modulus of each of the one or more unencrypted values.

12. The garbler device of claim 8, wherein the one or more processors are configured to send the garbled circuit that combines the two parties' unique data shares under a mask.

\* \* \* \* \*